(12) United States Patent
Drinic et al.

(10) Patent No.: US 10,144,210 B2
(45) Date of Patent: Dec. 4, 2018

(54) METHOD OF INCREASING THE OUTPUT OF A TRANSFER FILM UPON EMBOSSING AND APPARATUS SUITABLE FOR SAME

(71) Applicant: LEONHARD KURZ STIFTUNG & Co. KG, Furth (DE)

(72) Inventors: Ljubisa Drinic, Nuremberg (DE); Ralf Friedmann, Leutershausen (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 431 days.

(21) Appl. No.: 14/856,717

(22) Filed: Sep. 17, 2015

(65) Prior Publication Data

US 2016/0067955 A1 Mar. 10, 2016

Related U.S. Application Data

(62) Division of application No. 12/664,000, filed as application No. PCT/EP2008/004697 on Jun. 12, 2008, now Pat. No. 9,162,438.

(30) Foreign Application Priority Data

Jun. 14, 2007 (DE) .......................... 10 2007 027 493

(51) Int. Cl.
 *B41F 19/02* (2006.01)
 *B44C 1/17* (2006.01)
 (Continued)

(52) U.S. Cl.
 CPC ............ *B41F 19/02* (2013.01); *B41F 19/062* (2013.01); *B44C 1/17* (2013.01); *B44C 1/172* (2013.01);
 (Continued)

(58) Field of Classification Search
 CPC ..... B44C 1/1716; B44C 1/172; B44C 1/1725; B44C 1/1729; B44C 1/1737;
 (Continued)

(56) References Cited

U.S. PATENT DOCUMENTS 3,648,604 A * 3/1972 Warsager ................ B41F 16/00
 101/181
4,196,035 A * 4/1980 Reil ........................ B65B 61/00
 156/361
(Continued)

FOREIGN PATENT DOCUMENTS

EP 0433575 6/1991
EP 0673317 9/1996
(Continued)

*Primary Examiner* — Atul P. Khare
(74) *Attorney, Agent, or Firm* — Hoffmann & Baron, LLP

(57) ABSTRACT

There is described a method of increasing the output of a transfer film (1) upon embossing, in particular hot embossing, wherein the transfer film (1) has a carrier film (1*a*) and a transfer layer portion (1*b*) which is releasable from the carrier film (1*a*). During a first embossing operation first regions (10) of the transfer layer portion (1*b*) which are arranged removed from each other at a spacing a are transferred by means of a first embossing tool from the transfer film (1) onto at least one substrate (2), wherein first openings (10*a*) are produced at the spacing a in the transfer layer portion (1*b*) of the transfer film (1). After the first embossing operation the transfer film (1) is wound up after the first embossing operation and fed to at least a further embossing operation.

17 Claims, 5 Drawing Sheets

(51) Int. Cl.
*B65C 9/18* (2006.01)
*B65C 9/44* (2006.01)
*B41F 19/06* (2006.01)
*B29C 37/00* (2006.01)

(52) U.S. Cl.
CPC .......... *B44C 1/1725* (2013.01); *B44C 1/1729* (2013.01); *B65C 9/1873* (2013.01); *B65C 9/44* (2013.01); *B29C 2037/0046* (2013.01)

(58) Field of Classification Search
CPC ... B44C 1/1741; B44C 1/1745; B44C 1/1712; B65C 9/1873; B29C 2037/0046; B41F 19/62; B42D 15/10; B42D 2031/22; B42D 2031/24; B42D 2031/28
See application file for complete search history.

(56) References Cited

U.S. PATENT DOCUMENTS

| | | | |
|---|---|---|---|
| 4,701,235 A * | 10/1987 | Mitsam | B44C 1/1729 156/233 |
| 5,207,855 A | 5/1993 | Nyfelder et al. | |
| 5,611,272 A * | 3/1997 | Steuer | B29C 59/04 101/225 |
| 5,820,971 A * | 10/1998 | Kaule | B32B 38/04 156/209 |
| 6,202,549 B1 | 3/2001 | Mitsam et al. | |
| 6,223,799 B1 * | 5/2001 | Johnstone | B41M 5/398 156/230 |
| 6,387,201 B1 * | 5/2002 | Stuart | B41F 19/062 101/23 |
| 6,519,821 B2 * | 2/2003 | Steuer | B41F 19/068 29/17.1 |
| 6,531,016 B1 * | 3/2003 | Weber | B41M 5/0358 156/230 |
| 2001/0052171 A1 | 12/2001 | Steuer | |

FOREIGN PATENT DOCUMENTS

| | | |
|---|---|---|
| EP | 1155831 | 11/2001 |
| JP | 04138231 | 5/1992 |
| JP | 08282197 | 10/1996 |
| JP | 09052347 | 2/1997 |
| JP | 2002283798 | 10/2002 |
| WO | WO9413487 | 6/1994 |
| WO | WO0124945 | 4/2001 |

* cited by examiner

METHOD OF INCREASING THE OUTPUT OF A TRANSFER FILM UPON EMBOSSING AND APPARATUS SUITABLE FOR SAME

This application is a divisional application of U.S. application Ser. No. 12/664,000, filed Jan. 20, 2010, which claims priority based on an International Application filed under the Patent Cooperation Treaty, PCT/EP2008/004697, filed on Jun. 12, 2008 and German Application No. DE 102007027493.0-27, filed on Jun. 14, 2007.

BACKGROUND OF THE INVENTION

The invention concerns a method of increasing the output of a transfer film upon embossing, in particular hot embossing, wherein the transfer film has a carrier film and a transfer layer portion which is releasable from the carrier film, wherein during a first embossing operation first regions of the transfer layer portion which are arranged removed from each other at a spacing a are transferred by means of a first embossing tool from the transfer film onto at least one substrate, wherein first openings are produced at the spacing a in the transfer layer portion of the transfer film.

In the operation of embossing on cards of paper or plastic material for the mass production of bankcards, credit cards, telephone cards, driving license cards, identity cards and the like, regions of a transfer layer portion of a transfer film are embossed onto a card substrate by means of known card production apparatuses, for example of the "Cardline" type from Atlantic Zeiser, with up to 40,000 cards per hour being embossed. To achieve such high levels of embossing output a hot rolling embossing method is usually employed, in which an embossing wheel whose surface has raised segments in the shape of the regions to be embossed out of the transfer layer portion of the transfer film is used. The embossing wheel is also usually followed by a cooling device to which the embossed card substrate and the transfer film still adhering to the card substrate is fed for being cooled down before the transfer film is separated from the card substrate. In the operation of separating the card substrate and the transfer film the regions of the transfer layer portion which have been embossed onto the card surface remain on the card substrate. The transfer film which is pulled off only still has on the carrier film the part of the transfer layer portion, which was not fixed on the card surface. After the embossing operation therefore this involves a carrier film with a transfer layer portion having holes, as a waste product.

The card substrates are usually fed to the apparatus with a transport device, transport chains involving a constant chain pitch frequently being employed. In that case the transfer film is used over a length corresponding to the respective chain pitch for each individual card, independently of the regions which are actually to be embossed out of the transfer film. After the embossing operation a relatively large remainder of transfer layer portion is left unused on the carrier film. In the case of a mass-produced item such as a card, in spite of the relatively high costs for transfer films, it is only possible to achieve low prices for each card so that card manufacture which is as economical as possible is required.

To make better use of a transfer film, a relatively complicated and expensive apparatus has already been proposed in accordance with EP 0 673 317 B1, in which the transfer film can be simultaneously used for embossing on a plurality of substrates arranged in mutually juxtaposed relationship in the transport direction, using a direction-changing arrangement.

SUMMARY OF THE INVENTION

Therefore the object of the invention is further to improve the economy of embossing processes in terms of the utilization of transfer films and to provide a method suitable for that purpose and a simple apparatus.

According to the invention the object is attained for a method of increasing the output of a transfer film upon embossing, in particular hot embossing, wherein the transfer film has a carrier film and a transfer layer portion which is releasable from the carrier film, wherein during a first embossing operation first regions of the transfer layer portion which are arranged removed from each other at a spacing a are transferred by means of a first embossing tool from the transfer film onto at least one substrate, wherein first openings are produced at the spacing a in the transfer layer portion of the transfer film, and wherein the transfer film is wound up after the first embossing operation and fed to at least a further embossing operation in which second regions of the transfer layer portion respectively arranged between two first openings are transferred from the transfer film onto at least one further substrate by means of a second embossing tool, wherein second openings are produced in the transfer layer portion of the transfer film, arranged at a spacing from the first openings.

The object is attained for an apparatus for carrying out the method according to the invention, which has the following units:

a transfer film storage means which provides the transfer film in wound-up form, an embossing tool which forms the first and second embossing tool and to which the transfer film is fed from the transfer film storage means, and a transfer film take-up means onto which the transfer film inclusive of the first openings is wound after the first embossing operation, wherein arranged between the embossing tool and the transfer film take-up means is a first sensor unit which by means of at least one first sensor detects a position of the first openings in the transfer layer portion of the transfer film prior to the step of winding onto the transfer film take-up means in the form of first control data and that arranged between the transfer film storage means and the embossing tool is a second sensor unit which by means of at least one further sensor detects a position of the first openings in the transfer layer portion of the transfer film prior to the at least one further embossing operation in the form of second control data.

The transfer film which was originally discarded as waste after the first embossing operation, with the transfer layer portion having the first openings, is accordingly used at least a second time. In this case the used transfer film, with a sufficient spacing between the first openings, can either be used once again in the same embossing process or it can be used for other embossing processes in which regions of different shape are embossed out of the transfer layer portion. That is possible if the transfer film is wound up uniformly and particularly carefully after the first embossing operation so that the transfer film does not suffer from any fold formation or excessive deformation. Partial detachment from the carrier film or damage to the transfer layer portion on the transfer film which has already been used once is to be avoided in order to be able to carry out the at least one further embossing operation with as little trouble as possible.

In that respect it is particularly preferred for the transfer film to be used twice, but upon suitably careful handling of the transfer film which has been used, it is also possible to follow that with still further embossing operations.

It is particularly preferred if the first embossing tool is used again as the second embossing tool. After the first embossing operation the transfer film coil which has already been used once is accordingly used again and fed again to the apparatus which has already been used once, with the first embossing tool. That is possible if a sufficiently large region of transfer layer portion remains between the first openings, for second openings, the dimensions of which correspond to those of the first openings.

It has accordingly proven to be desirable if the first openings and the second openings are of the same size. However it is also possible to form first and second openings of different sizes or of different shapes.

It is advantageous if a first opening and an adjacent second opening are formed spaced from each other by at least 0.5 mm, in particular at least 1 mm. That avoids an overlap of first and second openings which would lead to incomplete embossing on the at least one further substrate. Furthermore detachment of thin limb portions of the transfer layer portion between two adjacent openings is reliably avoided, when unwinding the transfer film which has already been used.

It has also proven desirable if the at least one substrate and the at least one further substrate are used with the same dimensions. Thus for example the same card substrates can be processed in the first embossing operation, as in the at least one further embossing operation.

In regard to an implementation which can be controlled as well as possible in respect of the at least one further embossing operation, it has proven desirable if the spacing a between two adjacent first openings is kept constant over the entire length of the transfer film. It is necessary also to provide for that if a machine stoppage or another fault occurs during the first embossing operation.

In that respect it has proven to be advantageous if a position of the first openings in the transfer layer portion of the transfer film is detected in a first sensor unit by means of at least one first sensor in the form of first control data.

During the first embossing operation preferably a sequence of movements, in particular a speed and/or a spatial position, of the first embossing tool and/or of the transfer film and/or of a transport device for transporting the at least one substrate is regulated by means of the first control data.

To implement positioning of the second openings during the at least one further embossing operation in correct positional relationship, in particular a position of the first openings in the transfer layer portion of the transfer film is detected before the at least one further embossing operation in a second sensor unit which has at least one sensor in the form of second control data.

The second sensor unit preferably has in total three further sensors, wherein the position of a first opening is determined by means of two sensors and a position of the second opening to be formed in adjacent relationship with said first opening is ascertained by means of the third sensor. As slight stretching or distortion of the transfer film can occur when winding up the used transfer film, it is no longer to be assumed that there is a constant spacing a between the first openings when carrying out the at least one further embossing operation but rather the spacings which are really present between the first openings and the lengthwise dimensions which really occur in respect of the first openings must be taken into consideration.

The sensors of the first sensor unit and/or the second sensor unit are preferably optical sensors.

It is preferable if during the at least one further embossing operation a sequence of movements, in particular a speed and/or a spatial position, of the second embossing tool and/or of the transfer film and/or of a transport device for transporting the at least one further substrate is regulated by means of the second control data.

It is particularly preferred if the transfer film is fed from a transfer film storage means in the form of a first film cartridge to the first embossing tool and after the first embossing operation is wound with a constant film tension onto a transfer film take-up means in the form of a second film cartridge. In that case the transfer film storage means is formed in particular by a first film cartridge and the transfer film take-up means is formed in particular by a second film cartridge, which each include an annular core and two cover plates, so that the transfer film can be wound around the core and is laterally confined by a respective one of the two cover plates. Such a film cartridge is thus similar to a film reel which permits the used transfer film to be wound on in a particularly uniform and trouble-free fashion, and renewed use thereof.

For that purpose after the first embossing operation the second film cartridge onto which the transfer film inclusive of the first openings was wound is used as the transfer film storage means for performing the at least one further embossing operation. The empty first film cartridge in contrast is used as the transfer film take-up means. For that purpose the position of the first and second film cartridges is easily interchanged on the apparatus.

Preferably the apparatus has a respective drive motor for the regulated drive of the first and second film cartridges to unwind the transfer film on the transfer film storage means and to wind it on at the transfer film take-up means.

Embossable materials such as paper, plastic material or laminates containing paper and/or plastic film have proven desirable as substrates.

It is particularly preferred if the at least one substrate and the at least one further substrate are respectively formed by a card, in particular a bankcard, a credit card, a telephone card, a driving license card, an identity card, a lottery card or a gift card.

The first and second regions of the transfer layer portion of the transfer film can be permanently fixed on the respective substrate by means of embossing. That is usual in particular for forming security elements which should no longer be detachable such as for example security elements with holographic representations, codings, corporate logos and the like. The first and second regions of the transfer layer portion of the transfer film however can also be arranged by means of embossing on the substrate in the form of a covering which can be at least partially scratched off. That is usual for example for lottery tickets in which win information is to be optically masked by a removable cover layer.

To form a winding which is as uniform as possible of used transfer film, it has proven desirable if the apparatus has between the embossing tool and the transfer film take-up means a first transfer film tensioning device which keeps the film tension of the transfer film constant in the region between the embossing tool and the transfer film take-up means, in particular a first transfer film tensioning device which includes a movable first tensioning roller or first dancer roller. The term "movable" is used here to mean that the position of the axis of rotation of the tensioning or dancer roller can be altered.

It is further advantageous if there is arranged between the transfer film storage means and the second sensor unit a second transfer film tensioning device which keeps the film tension of the transfer film constant in the region between the transfer film storage means and the embossing tool, in particular a second transfer film tensioning device which includes a movable second tensioning roller or second dancer roller. The term "movable" is used here to mean that the position of the axis of rotation of the tensioning or dancer roller can be altered.

In that respect a position of the first and/or second tensioning roller or dancer roller is preferably pneumatically variable.

In particular there is a control unit for controlling the position of the first and/or second tensioning roller or dancer roller.

The embossing tool of the apparatus is preferably in the form of an embossing wheel which permits a rolling embossing procedure to be performed. To drive the embossing wheel, it has been found desirable to provide a servomotor or an operatively driving coupling to the drive of the transport device for transporting the substrates and to regulate the speed of the embossing wheel in accordance with the settings provided by the first or second control data.

The embossing wheel is in particular so arranged that it is opposite a counterpressure or backing roller. The embossing tool and/or the counterpressure roller are preferably heatable, in particular when performing a hot embossing method.

To increase the embossing speed it is preferable if at least one cooling device is arranged between the embossing tool and the transfer film take-up means of the apparatus, for cooling at least the first and/or second regions of the transfer film. The at least one cooling device preferably includes a blower.

BRIEF DESCRIPTION OF THE DRAWINGS

FIG. 1 diagrammatically shows a transfer film in the first embossing operation,

FIG. 2 shows the transfer film of FIG. 1 in a further embossing operation,

FIG. 3a shows the transfer film after the two embossing operations of FIGS. 1 and 2, FIG. 3b shows the further substrates 2' after the further embossing operation, FIG. 4 shows a diagrammatic side view of an apparatus for performing the method steps performed in FIGS. 1 and 2, and FIG. 5 shows a portion W from the apparatus of FIG. 4 in the region of the second sensor unit.

DETAILED DESCRIPTION OF THE INVENTION

Figure 1:
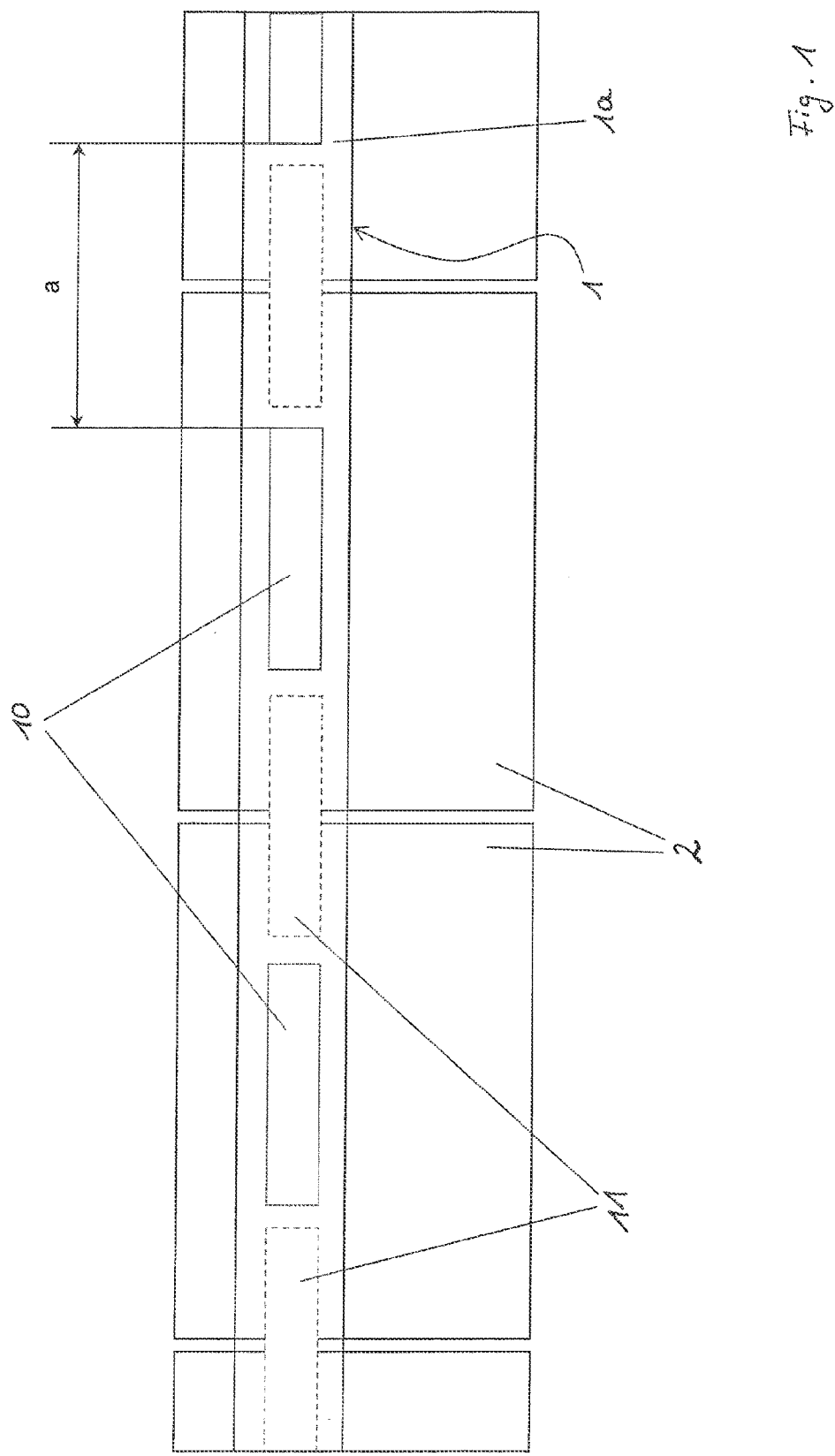
FIGS. 1 through 5 are intended to describe by way of example the method according to the invention and the apparatus according to the invention by reference to a card embossing method. In the drawing.

FIG. 1 diagrammatically shows a transfer film 1 in the first embossing operation in which substrates 2 in the form of cards are to be embossed upon. The substrates 2 are arranged in succession in a row. Arranged above the substrates 2 is a transfer film 1 in band form, which has a carrier film 1a and a transfer layer portion 1b which is not visible in this view (see FIG. 3a) on the side of the carrier film 1a, that is towards the substrates 2. In the first regions 10, the position of which on the transfer film 1 is indicated here by solid rectangular line the transfer layer portion 1b is embossed onto the substrates 2, in which case the first regions 10 are respectively disposed on the transfer film 1 spaced from each other at the constant spacing a. In the operation of embossing the first regions 10 out of the transfer layer portion 1b onto the substrates 2, a respective first opening 10a is produced in the transfer layer portion 1b of the transfer film 1 (see FIGS. 2 and 3a). After the first embossing operation the transfer film 1 is wound up in a uniform, regulated fashion.

Figure 2:
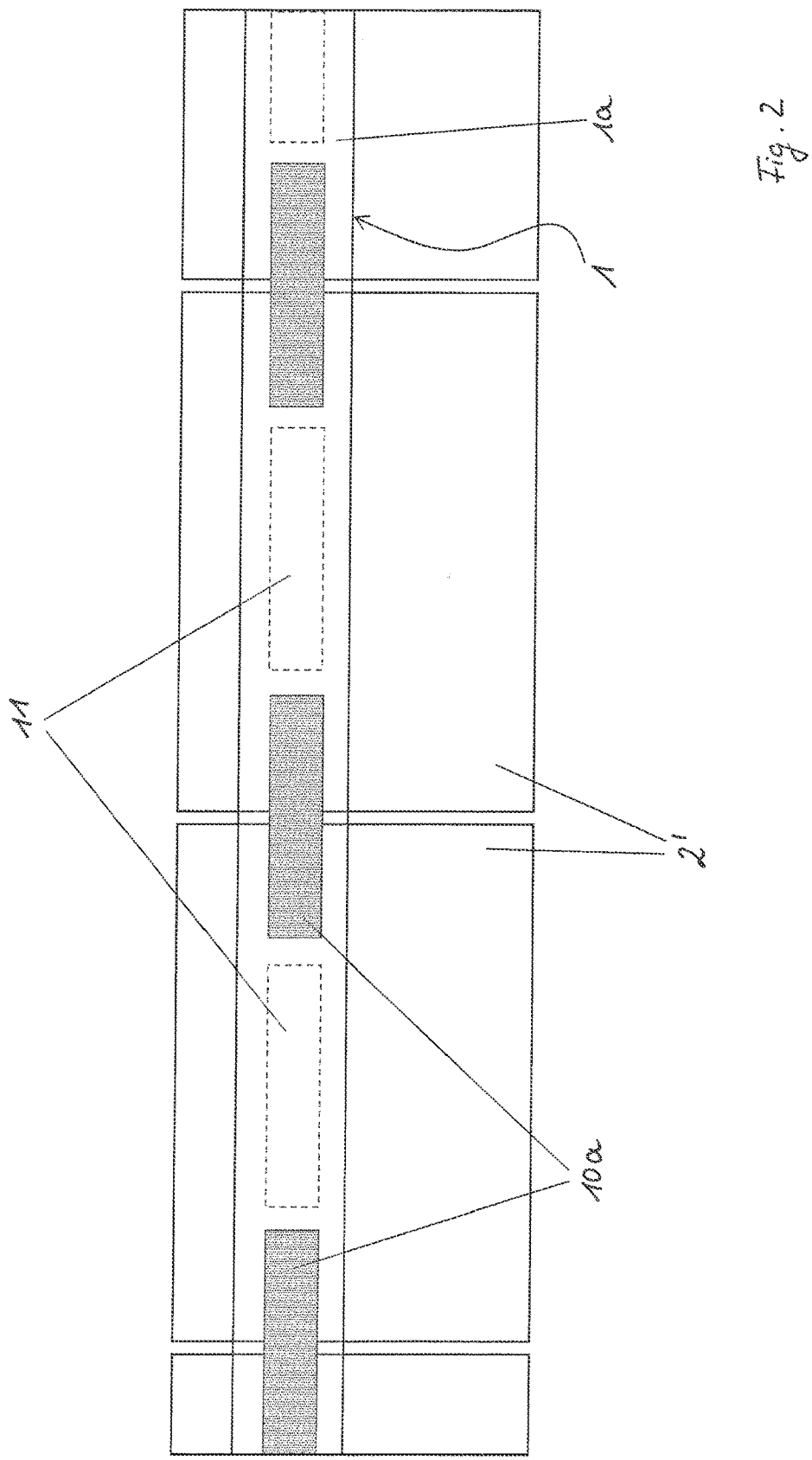
Figure 3:
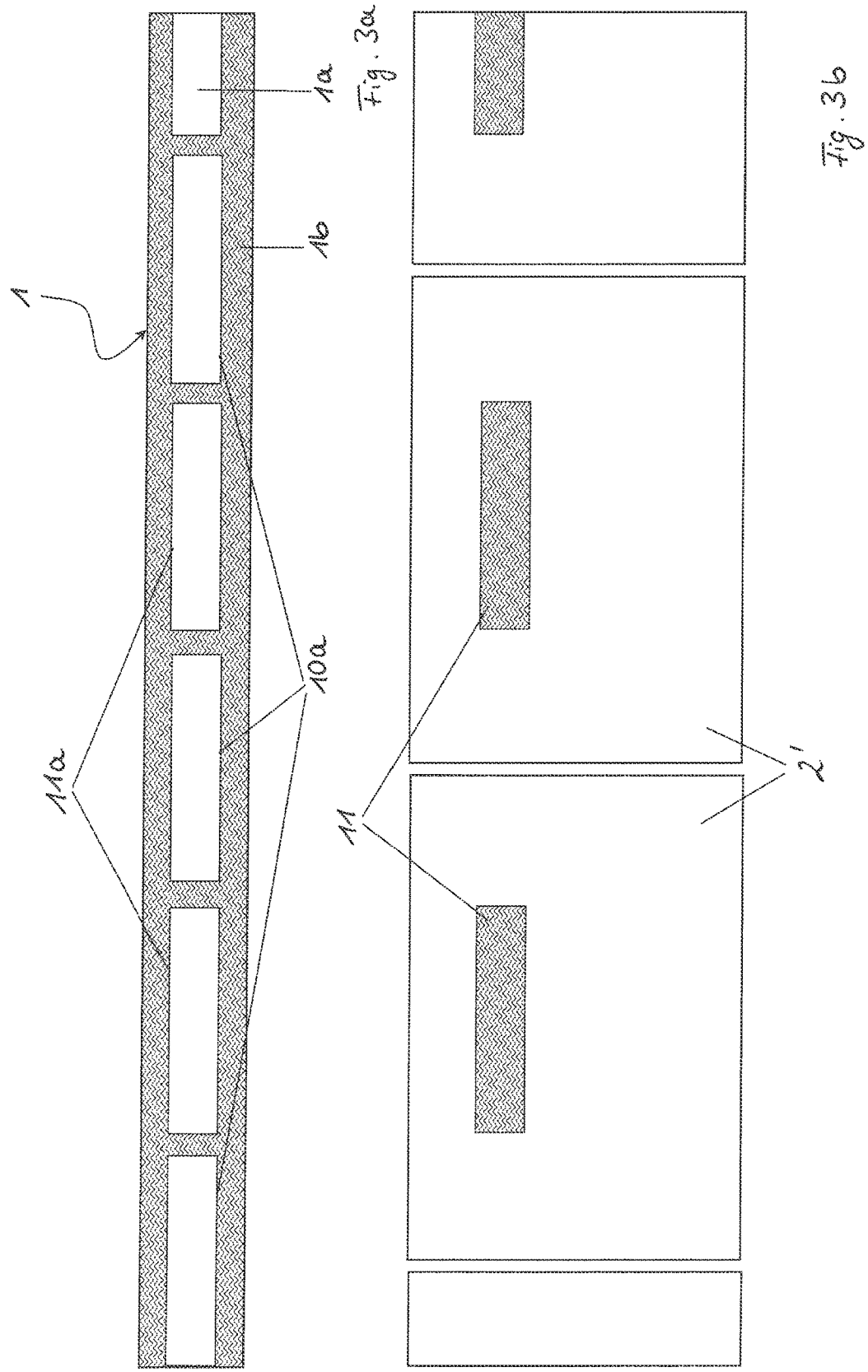

FIG. 2 now diagrammatically shows the transfer film 1 of FIG. 1 in the second embossing operation in which further substrates 2' in the form of cards are to be embossed upon. The substrates 2' are arranged in succession in a row. Disposed above the substrates 2' is the transfer film 1 which in the form of a band and which has the carrier film 1a and the transfer layer portion 1b which is not visible in this view (see FIG. 3a), on the side of the carrier film 1a that is towards the substrates 2'. The transfer layer portion 1b is embossed onto the substrates 2' in the second regions 11, the position of which on the transfer film 1 is indicated here by broken rectangular line, the second regions 11 being disposed between the first openings 10a produced in the first embossing operation in the transfer layer portion 1b on the transfer film 1. The position of the first openings 10a in the transfer layer portion 1b of the transfer film 1 is indicated in this view by hatched areas.

In the operation of embossing the second regions 11 onto the substrates 2', second openings 11a are produced in the transfer layer portion 1b of the transfer film 1 (see FIG. 3a).

FIG. 3a shows the transfer film 1 after the first and further embossing operations viewed from the side in FIGS. 1 and 2, on which the transfer layer portion 1b is disposed. The transfer layer portion 1b has first openings 10a which were formed during the first embossing operation and also second openings 11a which were formed during the further embossing operation. The first openings 10a and the second openings 11a give a free view onto the carrier film 1a.

FIG. 3b shows the further substrates 2' which as shown in FIG. 2 were embossed upon with the second regions 11 of the transfer layer portion 1b of the transfer film 1 after removal of the transfer film 1.

Figure 4:
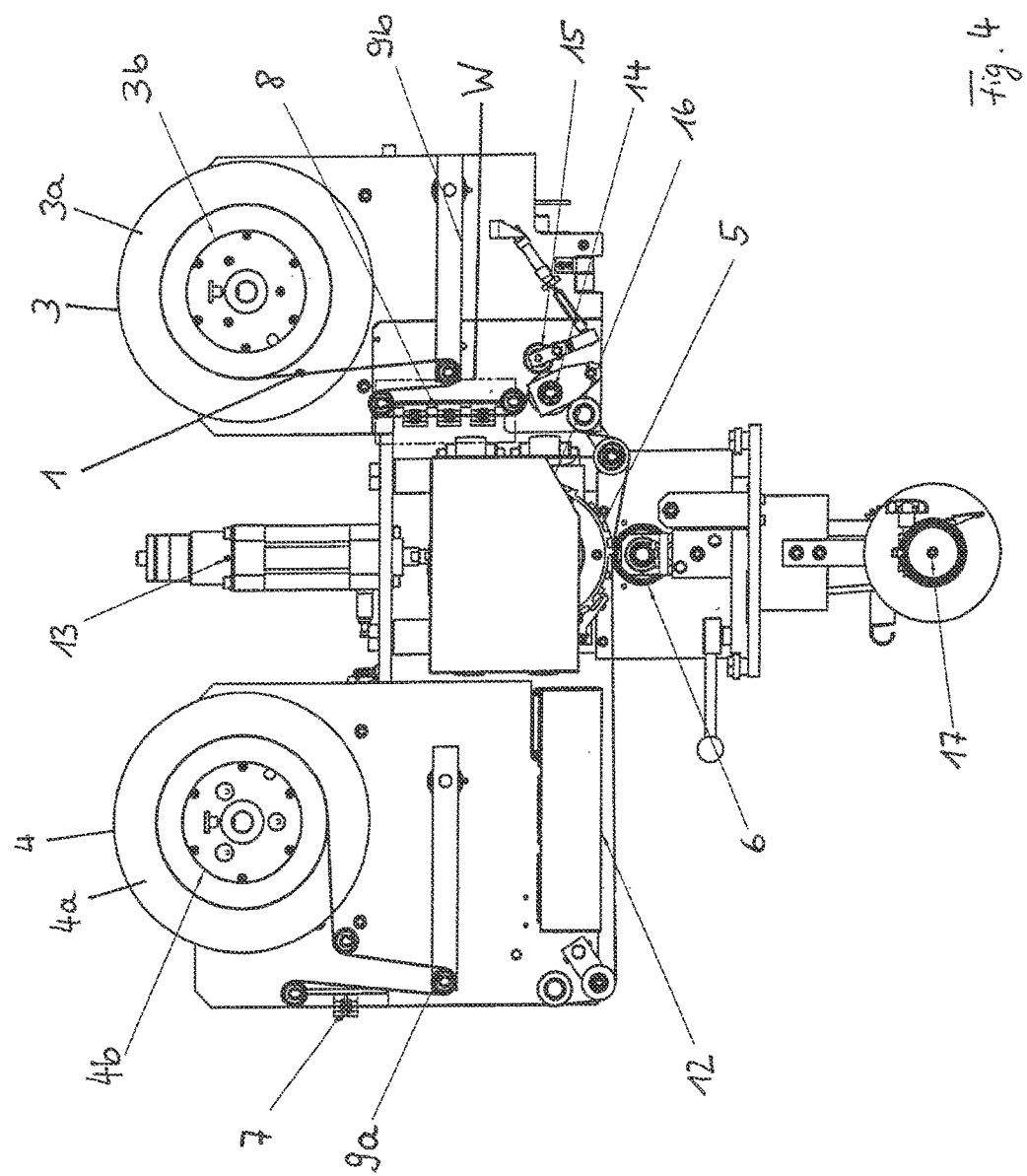

FIG. 4 shows an apparatus for carrying out the method steps performed in accordance with FIGS. 1 and 2, as a diagrammatic side view. The transfer film 1 is provided by way of a transfer film storage means 3 in the form of a first film cartridge driven in rotation by means of a motor, wherein the transfer film 1 is wound onto the core 3b of the first film cartridge, the core 3b being disposed between the cover plates 4a, and is fed to the second sensor unit 8 by way of a second transfer film tensioning device which includes a second dancer roller 9b and which keeps the transfer film tension constant. After the second sensor unit 8 the transfer film 1 passes to a pulling mechanism 14 driven by means of a servomotor, and to the contact pressure roller 15.

From there the transfer film 1 is fed to an embossing tool 5 in the form of a segmented embossing wheel, the contact pressure force of which in relation to a counterpressure or backing roller 6 can be regulated by way of an embossing cylinder 13 involving stroke adjustment. The transfer film 1 and the substrates 2 (not shown here) are conveyed through between the embossing tool 5 and the counterpressure roller 6 for carrying out the first embossing operation. The embossing tool 5 is heatable by means of a heating hood 16. Segment adjustment 17 serves for adjusting the position of the area to be embossed on a substrate in the longitudinal direction thereof. The first regions 10 of the transfer layer portion 1b of the transfer film (see FIGS. 1 through 3) are fixed to a respective one of the substrates 2 by means of the embossing tool 5 during a first passage of the transfer film 1 through the apparatus. Downstream of the embossing tool 5 the composite assembly comprising the substrate 2 and the transfer film 1 is fed jointly to a cooling device 12 and then the transfer film 1 is pulled off the embossed substrate 2. A first region 10 of the transfer layer portion 1b remains fixed to each substrate 2. The transfer film 1 inclusive of the first openings 10a is now fed to the transfer film take-up means 4 in the form of a second film cartridge driven in rotation by means of a motor, by way of a first sensor unit 7 and a first transfer film tensioning device which includes a dancer roller 9a and which keeps the transfer film tension constant, and is wound onto the core 4b of the second film cartridge which is between the cover plates 4a. During the first embossing operation the first sensor unit 7 by means of an optical sensor detects the position of the first openings 10a in the transfer layer portion 1b of the transfer film 1 and produces first control data, by means of which a sequence of movements of the embossing tool 5 and/or the transfer film 1 and/or a transport unit which is not shown here, for example in the form of a transport chain, for transporting the substrates 2 is regulated in such a way that the spacing a between the first openings 10a remains constant or at least substantially constant. After the second embossing operation is performed the second film cartridge of the transfer film take-up means 4 inclusive of the transfer film 1 which now has the first openings 10a is exchanged with the empty first film cartridge of the transfer film storage means 3 and a renewed run of the transfer film 1 through the apparatus is started for performing a further embossing operation. Now, in the region of the second sensor unit 8, the position of the first openings 10a is detected by means of optical sensors 8a, 8b and the position of the second regions 11 of the transfer layer portion 1b, which are to be respectively stamped out between two adjacent first openings 10a, is ascertained by means of a third optical sensor 8c (see FIG. 5). Accordingly, during the second embossing operation, the second sensor unit 8 by means of three optical sensors detects the position of the first openings 10a in the transfer layer portion 1b of the transfer film 1 and regulates the sequence of movements of the embossing tool 5 and/or the transfer film 1 and/or the transport unit which is not shown here, for example in the form of a transport chain, for transportation of the further substrates 2' in such a way that the first openings 10a do not overlap with the second regions 11 and a spacing a is maintained between each first opening 10a and a second region 11 of at least 0.5 mm. After the second regions 11 are stamped out onto the further substrates 2' by the embossing tool 5, that is followed by cooling and separation of the transfer film and the further substrates 2', as already described in relation to the first embossing operation. The transfer film 1 which now has the first openings 10a and the second openings 11a is wound onto the film cartridge of the transfer film take-up means 4.

The following settings for embossing of the card-form substrates 2, 2' are used for example:

| Process speed | 25000 card-form substrates 2, 2' per hour |
|---|---|
| Length of a card-form substrates 2, 2' | 85.6 mm |
| Chain pitch of the transport chain for transporting the substrates 2, 2' | 88.9 mm |
| Width of the transfer film | 10 mm |
| Dimensions of the first/second regions | 8 mm × 35 mm |
| Area of the first/second regions | 280 mm$^2$ |
| Transfer film consumption per hour | 22225 m$^2$ |
| Transfer film consumption per substrate 2 when carrying out only a first embossing operation | 889 mm$^2$ |
| Degree of use of the transfer film in only one embossing operation | 31.49% |
| Transfer film consumption per substrate 2' when carrying out a further embossing operation | 444.5 mm$^2$ |
| Degree of use of the transfer film in two embossing operations | 63% |

The costs of the transfer film are reduced accordingly by 41% by virtue of the double use of the transfer film for carrying out a first and a further embossing operation.

Figure 5:
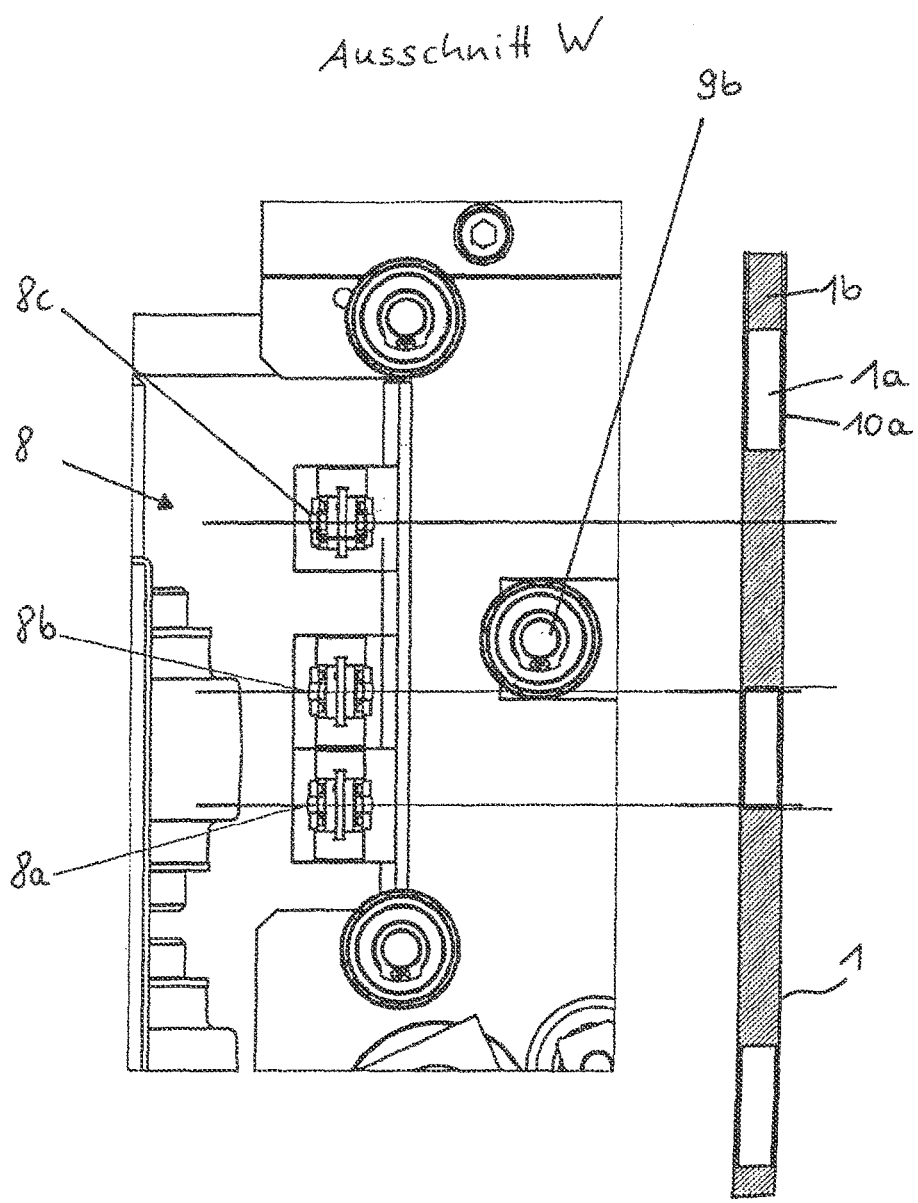

FIG. 5 shows the portion W of the FIG. 4 apparatus, in which the second sensor device 8 is disposed, but without the transfer film 1. The transfer film 1 which already has the first openings 10a in the transfer layer portion 1b of the transfer film 1 is shown to the right beside the second sensor unit 8, to better illustrate the mode of operation thereof. The second sensor unit 8 has three optical sensors 8a, 8b, 8c, wherein the two sensors 8a and 8b detect the position of the first openings 10a in the transfer layer portion 1b of the transfer film 1 during the second embossing operation. The sensor 8c serves to determine the position of the second region 11 which is still to be stamped out. The three sensors 8a, 8b, 8c form second control data which are used to regulate the movements of the embossing tool 5 and/or the transfer film 1 and/or a transport unit for transporting the further substrates 2', in such a way that the first openings 10a do not overlap with the second regions 11 and a spacing is maintained between first opening 10a and a second region 11 of at least 0.5 mm.

It will be appreciated that the method according to the invention can be used not only for embossing card-form substrates, but it is suitable for all embossing procedures in which a transfer film was only inadequately used after the first embossing operation and sufficiently large regions of the transfer layer portion have remained on the carrier film to be able to carry out a further embossing operation with the transfer film which has already been used.

LIST OF REFERENCES 1 transfer film
1a carrier film of the transfer film
1b transfer layer portion of the transfer film
2 substrate in card form
2' further substrate in card form
10 first regions of the transfer layer portion
10a first openings in the transfer layer portion
11 second regions of transfer layer portion
11a second openings in the transfer layer portion
3 transfer film storage means in the form of a first film cartridge
3a cover plates of the first film cartridge
3b core of the first film cartridge
4 transfer film take-up means in the form of a second film cartridge
4a cover plates of the second film cartridge
4b core of the second film cartridge 5 embossing tool
6 counterpressure roller
7 first sensor unit
8 second sensor unit
8a, 8b, 8c sensors of the second sensor unit
9a first dancer roller of the first transfer film tensioning device
9b second dancer roller of the second transfer film tensioning device
12 cooling device
13 embossing cylinder with stroke adjustment
14 pulling mechanism with servomotor drive
15 contact pressure roller
16 heating hood
17 segment adjustment

The invention claimed is:

1. An apparatus for embossing regions of a transfer layer portion of a transfer film onto a plurality of substrates, the apparatus comprising:
a transport unit for transporting the plurality of substrates;
a transfer film storage means for providing the transfer film in wound-up form;
a transfer film storage means drive motor for regulating drive of the transfer film storage means;
an embossing tool comprising an embossing wheel for performing a first and a second embossing operation and to which the transfer film is fed from the transfer film storage means, wherein, during the first embossing operation, first regions of the transfer layer portion, which first regions are arranged removed from each other at a spacing a with respect to one another, are each transferred by means of the embossing tool from the transfer film onto a respective one of first substrates of the plurality of substrates, and wherein the transferred first regions leave first openings from which they are transferred at the spacing a in the transfer layer portion of the transfer film;
an embossing wheel drive for regulating drive of the embossing wheel, the embossing wheel drive comprising a servomotor or an operatively driving coupling to a drive of the transport unit;
a transfer film take-up means onto which the transfer film inclusive of the first openings is wound after the first embossing operation; and
a transfer film take-up means drive motor for regulating drive of the transfer film take-up means,
wherein, arranged between the embossing tool and the transfer film take-up means is a first sensor unit which by means of at least one first sensor of the first sensor unit detects a position of the first openings in the transfer layer portion of the transfer film prior to the transfer film being wound onto the transfer film take-up means after the first embossing operation, the at least one first sensor of the first sensor unit producing first control data based on the detected position of the first openings,
wherein, arranged between the transfer film storage means and the embossing tool is a second sensor unit comprising a first sensor, a second sensor, and a third sensor, wherein as part of the second embossing operation, the first and second sensors of the second sensor unit detect the position of the first openings and the third sensor of the second sensor unit detects position of remaining transferable second regions which are each respectively arranged between two of the first openings in the transfer layer portion of the transfer film prior to each of the remaining second regions being transferred by means of the embossing tool to a respective one of further substrates of the plurality of substrates in the second embossing operation, the second sensor unit producing second control data based on the detected position of the first openings and the position of the second regions, and
wherein the first and second control data are used to regulate a speed of each of the transport unit, the transfer film storage means drive motor, the embossing wheel drive, and the transfer film take-up means drive motor during the first and second embossing operations, respectively.

2. An apparatus as set forth in claim 1, wherein the transfer film storage means comprises a first film cartridge and the transfer film take-up means comprises a second film cartridge, and wherein each of the first and second film cartridges include an annular core and two cover plates so that for each of the first and second film cartridges, the transfer film can be wound around the core and can be laterally constricted by a respective one of the two cover plates.

3. An apparatus as set forth in claim 2, wherein the transfer film storage means drive motor unwinds the transfer film from the first film cartridge and the transfer film take-up means drive motor winds the transfer film onto the second film cartridge.

4. An apparatus as set forth in claim 2, wherein the first and second film cartridges are interchangeable between the transfer film storage means and the transfer film take-up means.

5. An apparatus as set forth in claim 1, wherein there is arranged between the embossing tool and the transfer film take-up means a first transfer film tensioning device for keeping tension of the transfer film constant in the region between the embossing tool and the transfer film take-up means.

6. An apparatus as set forth in claim 5, wherein there is arranged between the transfer film storage means and the second sensor unit a second transfer film tensioning device for keeping tension of the transfer film constant in the region between the transfer film storage means and the embossing tool.

7. An apparatus as set forth in claim 6, wherein the first transfer film tensioning device includes a first tensioning or dancer roller and a position of the first tensioning or dancer roller is pneumatically variable.

8. An apparatus as set forth in claim 7, wherein the second transfer film tensioning device includes a second tensioning or dancer roller and a position of the second tensioning roller is pneumatically variable.

9. An apparatus as set forth in claim 6, further comprising a control unit for controlling the position of the first and/or second tensioning or dancer rollers.

10. An apparatus as set forth in claim 1, wherein during the first embossing operation, a sequence of movements of the embossing tool and/or of the transfer film and/or of the transport unit for transporting the first substrates of the plurality of substrates is regulatable using the first control data.

11. An apparatus as set forth in claim 10, wherein the sequence of movements influence a spatial position of the embossing tool and/or of the transfer film and/or of the transport unit.

12. An apparatus as set forth in claim 1, wherein during the second embossing operation, a sequence of movements of the embossing tool and/or of the transfer film and/or of the transport unit for transporting second substrates of the plurality of substrates is regulatable using the second control data.

13. An apparatus as set forth in claim 12, wherein the sequence of movements influence a spatial position of the embossing tool and/or of the transfer film and/or the transport unit.

14. An apparatus as set forth in claim 1, wherein each of the sensors of the first sensor unit and/or the second sensor unit is an optical sensor.

15. An apparatus as set forth in claim 1, wherein the embossing wheel drive is a servomotor.

16. An apparatus as set forth in claim 1, wherein the transfer film comprises the transfer layer portion and a carrier film from which the transfer layer portion is releasable for the first and second embossing operations.

17. An apparatus as set forth in claim 1, wherein each of the first and second substrates of the plurality of substrates are consecutively disposed, one after the other each receiving a respective one of the first and second transfer regions during the first and second embossing operations, respectively.

* * * * *